United States Patent [19]

Mondardini

[11] Patent Number: 4,518,824
[45] Date of Patent: May 21, 1985

[54] PUBLIC TELEPHONE METHOD AND APPARATUS WHEREIN THE USER'S PERSONAL TELEPHONE NUMBER AND A PERSONAL DIALING CODE ARE USED TO EFFECT DEBITING CHARGES

[75] Inventor: Massimo Mondardini, Turin, Italy

[73] Assignee: Urmet Sud S.P.A., Rome, Italy

[21] Appl. No.: 386,159

[22] Filed: Jun. 7, 1982

[30] Foreign Application Priority Data

Jun. 9, 1981 [IT] Italy .................................. 67787 A/81

[51] Int. Cl.³ ........................ G06K 5/00; H04M 17/02
[52] U.S. Cl. ................................. 179/6.3 CC; 235/381
[58] Field of Search ............ 179/6.3 CC, 90 CS, 18 B; 235/380, 381, 382

[56] References Cited

U.S. PATENT DOCUMENTS 4,326,123  4/1982  Hosterman ..................... 179/6.3 CC

FOREIGN PATENT DOCUMENTS 0009684  9/1979  European Pat. Off. .
2351949  10/1973  Fed. Rep. of Germany .
2903450  1/1979  Fed. Rep. of Germany .
3031470  8/1980  Fed. Rep. of Germany .
1442883  10/1973  United Kingdom .......... 179/6.3 CC

OTHER PUBLICATIONS

Copy of C&P Telephone Bill, bill date 12-17-80.
Copy of C&P Telephone Calling Card.
Article Landis & Gyr Mitteilungen vol. 27, No. 1, 1980, Zug. (CH) P. Wible: "Phonocard, die Telephonstation für den Betrieb mit vorbezahlten Karten", pp. 40-46.

Primary Examiner—Stafford D. Schreyer
Attorney, Agent, or Firm—Albert Josif; Guido Modiano

[57] ABSTRACT

The method provides for the acquisition by a public telephone set of the user's private telephone number and its transfer through centralized means along with information pertaining to the call effected, in particular the debiting of the private telephone number with the call. The user is assigned an identification card the validation whereof is performed by a reader associated with the public set, and a personal digital code which the user dials on a selector device associated with the set.

8 Claims, 4 Drawing Figures

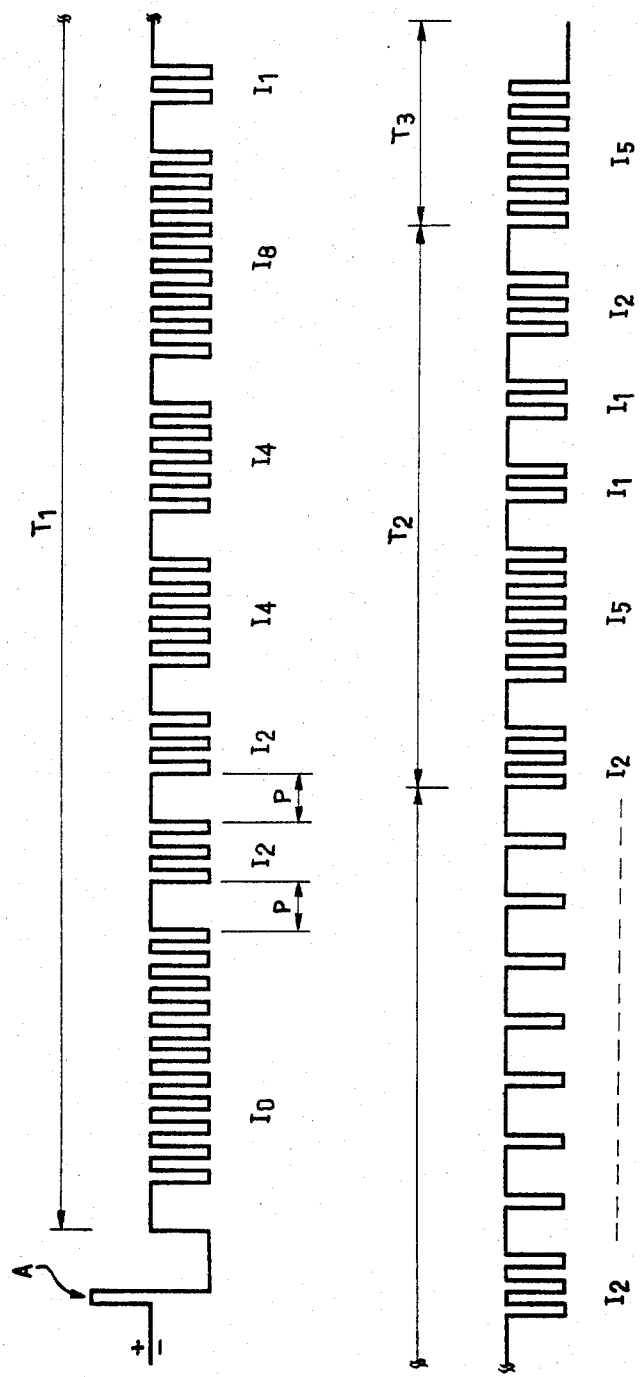

PUBLIC TELEPHONE METHOD AND APPARATUS WHEREIN THE USER'S PERSONAL TELEPHONE NUMBER AND A PERSONAL DIALING CODE ARE USED TO EFFECT DEBITING CHARGES

BACKGROUND OF THE INVENTION

This invention relates to method and apparatus for public telephony through normal and trunk call telephone sets (hereinafter U+I) equipped with a selector switch. In particular the invention relates to an improvement to a public telephone method and apparatus wherein the user's personal telephone number and a personal dialing code are used to effect debiting charges.

As a result of prior studies of the Applicant, a novel and different collection procedure has been developed which, substituting for previous systems operating on pre-payment by the introduction of coins and/or tokens, afforded the closest approximation, as regards payment by the user, between the amount collected and the amount due.

This known method provides essentially for the telephone set to accept coins and tokens, count them, and transmit the credit information to a centralized logics which processes a collection algorithm in accordance with the selection digits for rate discrimination purposes among the various types of calls, and transmits corresponding collection orders to the telephone set, the logics being bidirectionally connected to a supervisor device which controls its operation by transferring into it all the information data susceptible to programming and receiving therefrom statistic information related to telephone traffic and general monitoring.

The apparatus implementing said system comprises, for each telephone set, a corresponding exchange transducer with interface functions toward an exchange logics which controls a set of said transducers adapted to supply the exchange with information from the telephone sets and the latter with checking and operational orders as emitted by said logics; an exchange supervisor device being operatively connected to a group of exchange logic systems for the purpose of accepting from and transmitting to said logic systems or units programmable data, as well as general monitoring or alarm signals.

SUMMARY OF THE INVENTION

The task of the invention, beginning from the knowledge of the above described method and apparatus, is to provide an improvement thereon, which can afford a further important service, especially useful as regards payment by the user.

Within this task, it is an object of the invention to simplify and further improve on the collection operations, thus relieving the user of the need to get and handle coins and/or tokens, while ensuring for the service which operates the telephone facilities absolute protection against frauds.

A further important object of this invention is that of improving control over the serviceability of the public facility network by extending the transmission of any alarm conditions from the system peripheral members to a concentrating member.

According to one aspect of the present invention, the mentioned task and objects, as well as yet other objects, which will become more apparent hereinafter, are achieved by a public telephony method with normal and trunk telephone sets having selectors, of the type employing centralized logic system data transmission means, said centralized logic systems transmitting, in turn, enabling commands (for selection, collection, and the like purposes) to the telephone set, and centralized supervisor or monitoring means for handling groups of centralized logic systems whereto they transmit all the data which are susceptible to programming, characterized in that it consists of the acquisition by the public telephone set of the user's private telephone number, and of transferring, through the centralized system said number and data concerning the call made, in particular the debiting for said call, to said private telephone number.

More specifically, the improved system according to this invention is essentially based upon the concept of the public telephone set acquiring or accepting the private telephone number of the user, and of transferring, through the centralized system, both said number and information data pertaining to the call made, in particular to the debiting of the private telephone number in question with said call.

The system avails itself, for its practical implementation, of an "identification card", the validation whereof is effected through acceptation by reader means associated with an ordinary coin and/or token operated telephone set, and of a personal digital code to be dialled by the user on the set selector device, the functional mating of the dialled code with the information read from the card enabling the carrying out of the call by the user.

The apparatus implementing the above improved system according to the invention comprises, interconnected in mutual operational relationship, the telephone set, a corresponding transducer, an exchange logics acting on a set or group of transducers, a supervisor acting on a set or group of exchange logic systems, and an alarm signal concentrator.

Such means are adapted to embody the novel function through the following combination of components:

The telephone set is equipped with further mechanical and electronic means effective to perform the following functions:

acceptation or rejection of the identification card; and transmission of the informational readout and monitoring signals to the transducer.

The transducer, which serves the general function of interface between the telephone set and exchange logics, is provided with circuit and electronic means adapted to perform the following additional interface functions:

reception of the information pertaining to the identification card and personal digital code as transmitted from the telephone set; and transfer to the centralized logics of the data contained in the identification card.

Each centralized logic system, in addition to the circuitry developed in the prior studies, is similarly provided with electronic circuit means operative to perform the following additional functions:

acquisition from the transducers of the information derived from the selections, i.e. personal digital codes, and from the identification cards and related counts;

acknowledgement of functional mating or correspondance beten the data from the identification card and dialled personal code, and supply of the enabling command to the transducer upon acknowledgement; and transmission to the supervisor device of the information derived from the identification cards and related counts.

The centralized supervisor device, which is operatively connected to a set or group of centralized logic systems (e.g. sixtyfour in number), is in turn equipped with electronic circuit facilities adapted to perform the following additional characterizing functions:

acquisition from the centralized logic systems of the information supplied by the identification cards, such information specifically including the private telephone number and detected counts;

transmission over telephone lines to corresponding processing units of the information from the identification cards; and transmission of monitoring conditions to concentrator members over telephone lines.

Each monitor or alarm concentrator device is connected to a group of supervisors, and receives from the latter periodical monitor signals. It will be preferably located at operational centers made accessible to service personnel.

BRIEF DESCRIPTION OF THE DRAWINGS

Further features, objects and advantages of the invention will be apparent from the following detailed description, with reference to the accompanying exemplary and not limitative drawings, where:

FIG. 4 is a graph of one example of current signalling between the telephone set and transducer for reading an identification card.

DESCRIPTION OF THE PREFERRED EMBODIMENT

The following description will be related to an embodiment of a mixed system including coin and token operated telephone sets, operating in accordance with above described prior method, which are additionally provided with the necessary means for implementing the improvement according to this invention. Thus, parts which are common to said prior studies have been incorporated hereto for reference purposes.

Figure 1:
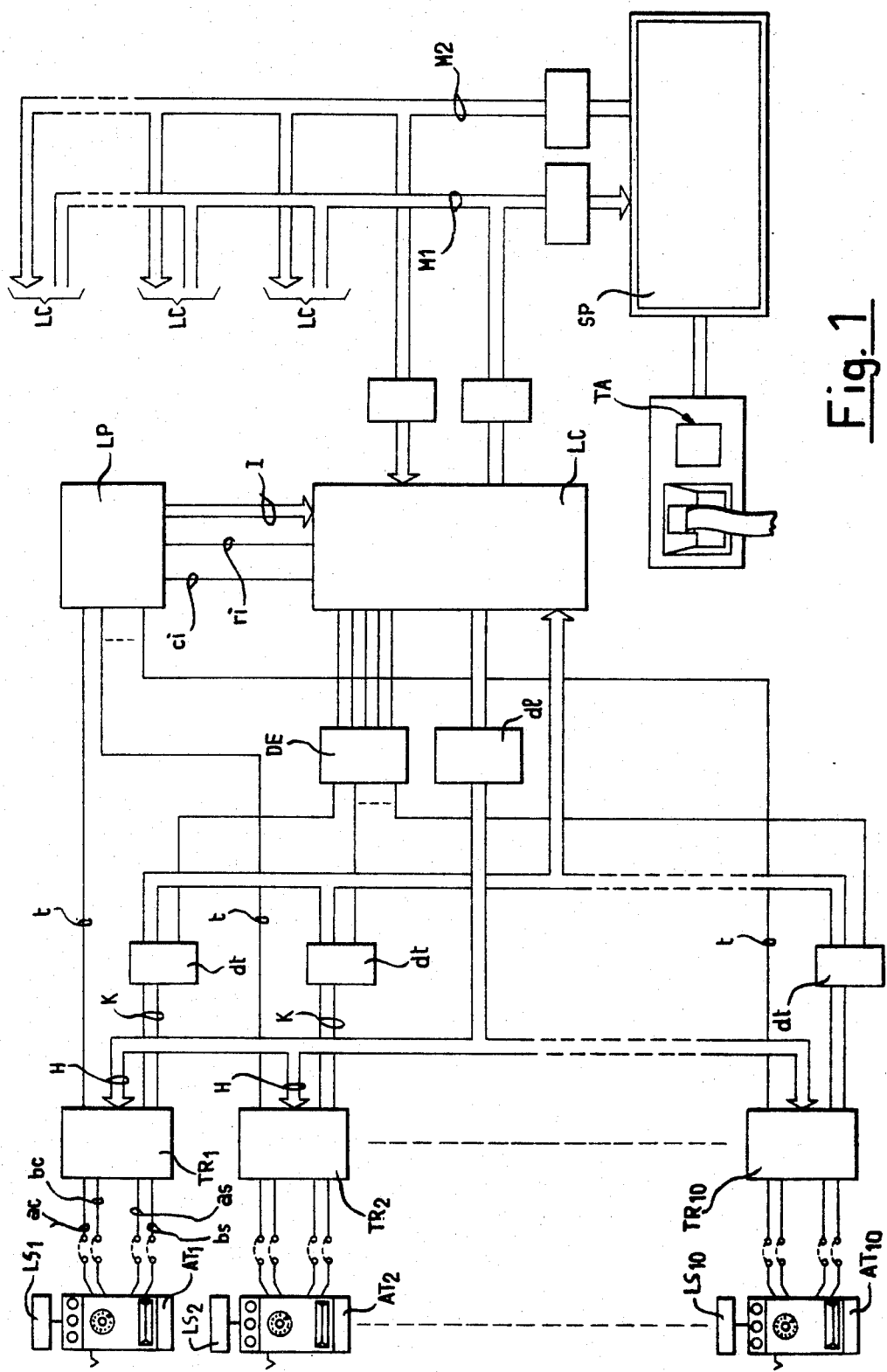
FIG. 1 is a simplified block diagram showing the general interconnection of the system characterizing elements, namely a public telephone set, a transducer, a centralized logics, and a supervisor.
Figure 2:
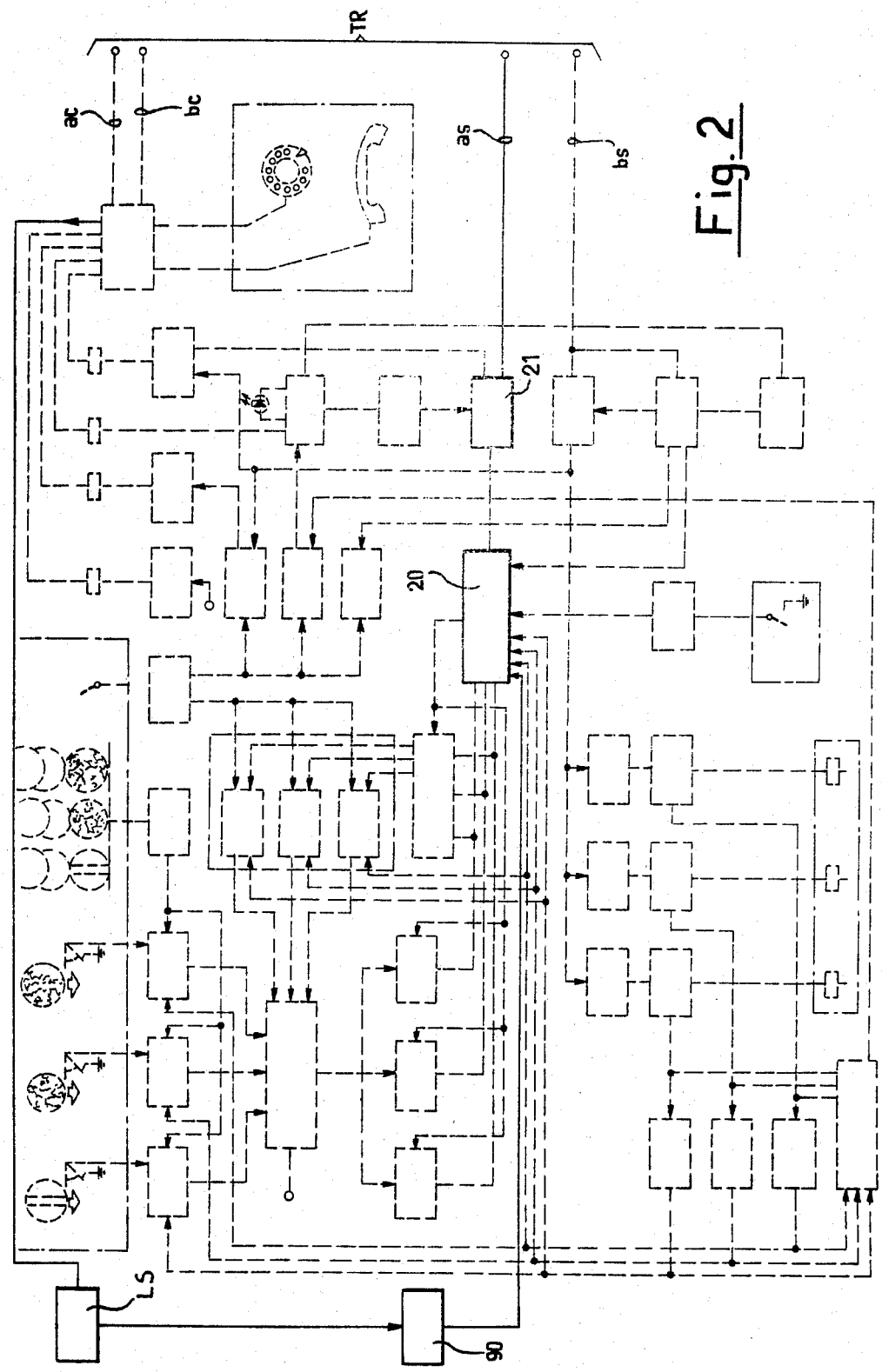
FIG. 2 is a block diagram of the electronic board implementing conventional and novel functions related to the telephone set.
Figure 3:
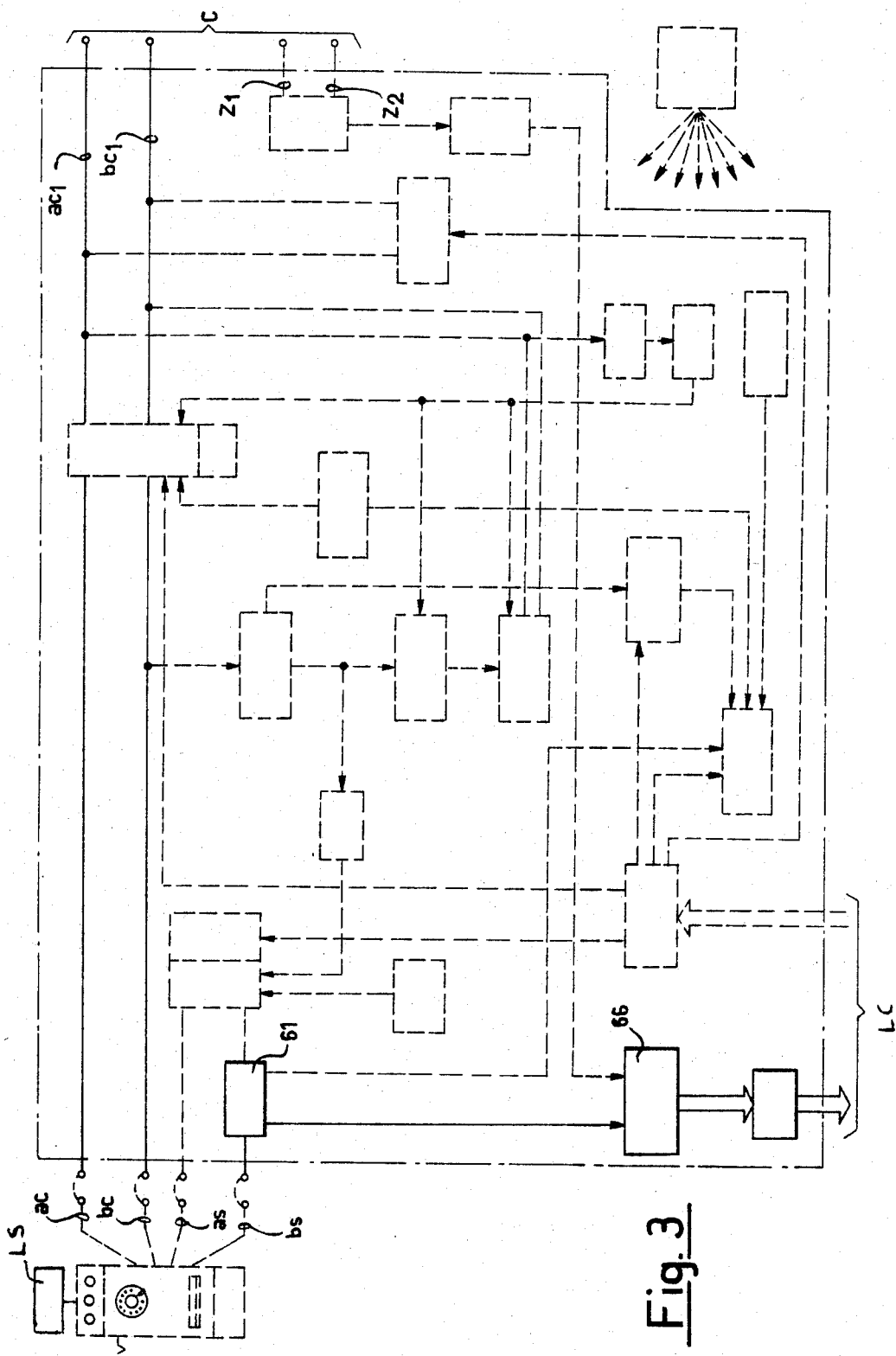
FIG. 3 is a block diagram of the transducer.

With initial reference to FIG. 1, it should be noted that the inventive system comprises a group of telephone sets $AT_1 \ldots AT_{10}$ preferably including no more than ten sets each connected to a corresponding transducer $TR_1 \ldots TR_{10}$ with interface functions between the set and exchange. The connection includes two voice leads ac-bc and two signalling leads as-bs. The latter two leads also feed all of the electric and electronic circuits in the telephone set. Signal exchange over the leads as-bs is accomplished by polarity reversing and on/off switching; polarity establishing the information direction of transmission (from set to transducer, and viceversa), the information being transmitted by means of suitably coded interruptions. Each transducer, additionally to the voice connection with the exchange station (not shown), includes a bidirectional connection to a centralized logics LC whereto it supplies a series of data, as by means of a bundle K of leads, e.g. eight leads, plus a strobe t relating to the so-called "ready datum" condition. The logics LC multiplexes the connection leads of the transducers forming the group being handled thereby—in the example being considered, eighty leads since there are ten transducers in a group—on a single 8-bit gate. The ready-datum signals are instead passed to a priority logics LP for selective logics-set connection. Each transducer receives in turn the commands from the logics LC through a group of leads H including, for example, four leads, three of which encode one of the possible commands and are multiplexed on all the transducers in the group, whilst the fourth serves to supply from the logics LC a warning signal "ready command") as processed by a decoder DE of the emitted address in synchronization with said signal. In the lead bundles K and H, there are interposed driver groups dt and dl, respectively; the groups dt for the transmission from the transducers to the logics LC being enabled by the address decoder DE. The centralized logics LC and the priority one LP, moreover, are interconnected by an interruption request lead ri, an interruption enabling lead ci, and a tansducer address group of leads I. A group of logics LC, comprising for instance up to sixtyfour logic systems, is also connected to a supervisor device SP. The connection between the supervisor SP and centralized logic systems LC is implemented by means of two multiplexers $M_1-M_2$ each comprising a preset number of leads and being intended, the former for transferring encoded data from the supervisor to the logic systems, and the latter for periodically transferring further data from the logic systems LC to the supervisor. With the supervisor SP there cooperates a keyboard TA equipped with a printer for the input of any types of programmable data to said supervisor. In accordance with this invention, the telephone sets $AT_1 \ldots AT_{10}$ are each provided with a card reader $LS_1 \ldots LS_{10}$, respectively, which may be of any conventional types, such as a magnetic or optical one. Consequently, the telephone set—which will preferably include coin or token operated enabling devices—is constructed circuit-wise as shown in FIG. 2. That diagram shows in full lines a transmission block 20 connected to the transducer through the leads as, with the interposition of a cut-out circuit 21. To the block 20 are supplied all the informational data from the known coin or token operated enabling system, as well as information from the card reader LS which has been stored in a buffer 90 associated with said reader. The reader LS is operatively connected, through an enabling circuit, to the telephone set hook contacts to be enabled at each engagement produced by the receiver being lifted. All of the remaining blocks shown in dash lines in FIG. 2 are relevant to coin or token operated enabling circuits, and their description is deemed to be unnecessary to the explanation of the improvement according to this invention. Similarly, the transducer shown in detail in FIG. 3, and functioning as an interface between the telephone set and central exchange, is substantially the same implementing the prior method. Of special interest to this description are the following items thereof:

the receiver 61 of the signalling line;

the transmitter 60 to the centralized logics;

the telephone line loop comprising the leads ac-bc; and the signalling leads as-bs.

The improved apparatus of this invention operates as follows.

Signalling between the telephone set and transducer

At each going on/offhook of the handset, the reader LS performs a readout operation on the identification card inserted thereinto. After the first digit of the personal code had been entered on the dial selector, the transducer TR sends a data call or request to the set AT by timed polarity reversing on the line as-bs. Thereafter, the set transfers into the receiver 61 of the transducer the information read from the identification card. This same information is transferred to the centralized logics through the transmitter 66. The procedure for that dialogue and the set and transducer circuits involved in it are the same as in the prior art, the one difference being that according to the prior art, it is the selection digits that activate the transducer whereas, according to this invention, it is the personal code digits that activate it. The personal code may comprise three digits which are dialled by the user on the selection device and read by the transducer over the line ac-bc. FIG. 4 illustrates an exemplary struture and encoding of the message for transmitting the contents of the identification card. The message relates to a user's telephone number, e.g. 02 244812, inclusive of the direct dialling numerical code followed by a five digit code, such as 25112 and one control digit (five). For each digit, the message includes pulses equal in number to the digit incremented by one unit. The user's telephone number is a standard fifteen-digit number. The pulse diagram of FIG. 4 shows:

a credit request pulse A;

the time $T_1$ of transmission of the telephone number for debiting, during which the pulses are transmitted, as discriminated by intervals P, which relate to the digits;

the time $T_2$ of transmission of the five digit code; and the time $T_3$ of transmission of the control digit.

This data assembly is transferred from the transducer to the centralized logics, which verifies the functional mating of the data read from the identification card with the personal code. If such a mating exists, the logics sends, through the transducer, the enabling command to select toward the exchange members to the telephone set. As regards the imrovement according to this invention, the exchange logics that is provided with storage means for storing the private telephone number for debiting, and with means for checking the mating of the data read on the identification card with the personal code dialled by the user. The supervisor SP serves to handle the centralized logic systems LC, and has the added function of a clock and calendar for the necessary system timing. Connection to the centralized logic systems is effected by means of a self-controlled circular scanning or polling. Thus the required elements are transmitted to the logic systems for the operation thereof. Each logics will receive sequentially: résumé counts, debiting telephone numbers, and state information on each telephone set, including accordingly the alarm conditions. The supervisor, or executive, will handle, moreover, the interface with the operator, who can interact, through the keyboard TA and printer, on the system operating conditions. The supervisor or executive SP is also in charge of the talk to data gathering centers. Such connections are effected through switched-over lines and follow the following different directions:

toward data processing centers, whereto all the data pertaining to the call made are sent. The importance of such a connection is self-evident for the purpose of generical statistic checks as well as of possible checks of judiciary nature. The connection occurs upon request by the processing center;

toward the working center of the networks for the transmission of the alarm or monitoring conditions. This allows the implementation of a centralized structure for alarm handling.

Preferably, the connection to the network working center is carried out with the interposition of an alarm concentrator device which is connected to a cluster of supervisors selected as a function of the area distribution of intervention by the service personnel. The talk occurs in a cyclic mode and at intervals on all the supervisors, under the control by the concentrator, and the alarms are divided into different classes of seriousness. The concentrator will also document anomalous situations to enable the personnel involved to correctly handle them.

Of course, based on this invention principle, the constructional details and embodiments may be amply varied with respect to what has been described and illustrated by way of example and not of limitation, without departing from the invention scope.

I claim:

1. A public telephone method comprising the steps of validation of an identification card by a reader associated to a public telephone set, in which said card has been inserted by a user, reading information data from the identification card by said reader, reception of signals of a dialling operation of a personal code performed by the user on a selection device of said public telephone set, transmitting by said public telephone set the information data read and said dialled personal code to a centralized logic system, ascertaining the functional mating between said information data and said personal code by the centralized logic system and enabling said public telephone set for the making of a call by the user, and debiting through said centralized logic system said call to a selected telephone number counter.

2. A public telephone method according to claim 1, wherein the information data read from the identification card comprise the user's private telephone number and said centralized logic system transfers the debiting of said telephone call to said user's private telephone number counter.

3. A public telephone method according to claim 1, wherein the information data read from said identification card are transmitted to the centralized logic system following pulsed encoding thereof.

4. A public telephone method according to claim 1, wherein the data read from the identification card and the personal code dialled by the user are transmitted to the centralized logic system by means of an interface transducer and through a signalling loop and a telephone line loop.

5. A public telephone method according to claim 4, wherein dialling of a first number of the personal code causes the activation of said interface transducer which accepts and then sends the information data read to the centralized logic system.

6. A public telephone method comprising the steps of validation of an identification card by a reader associated to a telephone set, in which said card has been inserted by a user, reading information data from the identification card by said reader, said information data comprising user's private telephone number, dialling a personal code on a selection device of the telephone set, transmitting the information data read and the code dialled to a centralized logic system, ascertaining the functional mating between said information data and said code by the centralized logic system, enabling the making of a call to the user and transferring, through the centralized system, said user's private number, data concerning the call and debiting of the call, to a data gathering centre for charging the call debiting to the private telephone number of the user.

7. A public telephone method according to claim 6, wherein the information data, comprising the user's private telephone number, contained in the identification card are transmitted to the centralized logic system following pulsed encoding thereof.

8. A public telephone method according to claim 6, wherein the data read from the identification card and the personal code dialled by the user are transmitted to the centralized logic system by means of an interface transducer and through a signalling loop and a telephone line loop, the dialling of a first number of the personal code causing the activation of said interface transducer which accepts and then sends the information data read to the centralized logic system.

* * * * *